Feb. 9, 1926.　　　　　　　　　　　　　　　　1,572,416
F. W. YOUNG
AIR HEATER FOR INTERNAL COMBUSTION ENGINES
Filed Jan. 10, 1925
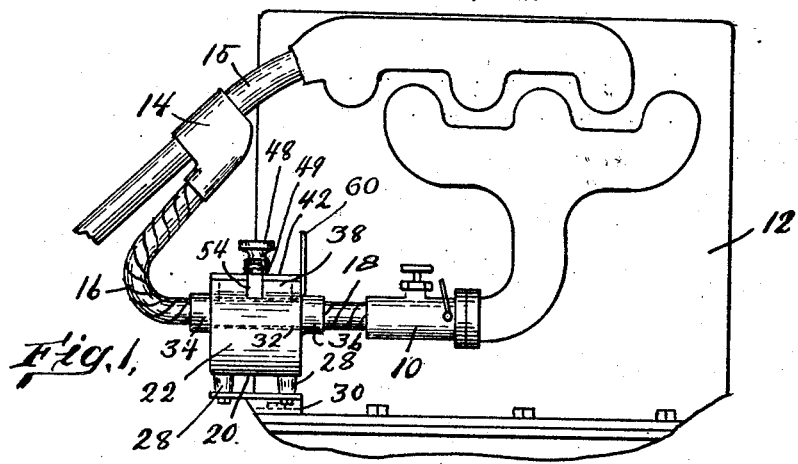
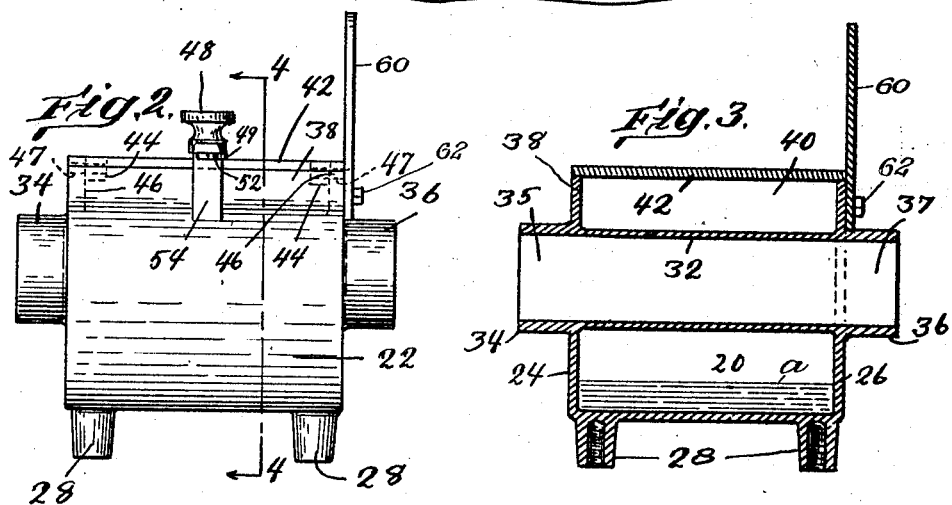
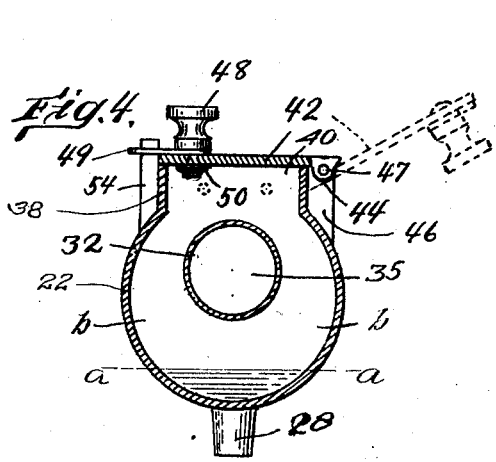
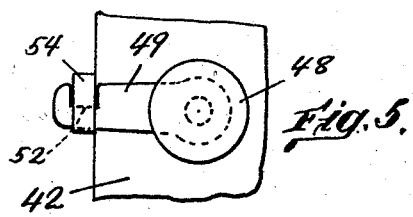
Inventor,
Franz W. Young
by T. T. Greenwood
atty Patented Feb. 9, 1926.

1,572,416

UNITED STATES PATENT OFFICE.

FRANZ W. YOUNG, OF EVERETT, MASSACHUSETTS.

AIR HEATER FOR INTERNAL-COMBUSTION ENGINES.

Application filed January 10, 1925. Serial No. 1,712.

*To all whom it may concern:*

Be it known that I, FRANZ W. YOUNG, a citizen of the United States, residing at Everett, in the county of Middlesex and State of Massachusetts, have invented an Improvement in Air Heaters for Internal-Combustion Engines, of which the following is a specification.

This invention relates to and has for its object the provision of a novel form of air heating device arranged to facilitate the starting of automobiles and other internal combustion engines in cold weather.

Fig. 1 is a fragmentary side elevation of an automobile engine with the invention applied thereto.

Fig. 2 is an enlarged front elevation of the heater.

Fig. 3 is a longitudinal sectional elevation through the heater.

Fig. 4 is a section along line 4—4 of Fig. 2.

Fig. 5 is a perspective detail of the cover latch.

The air heater embodying this invention is adapted to heat the air drawn into the carburetter 10 of an internal combustion engine 12, whereby to facilitate the forming of a combustible charge therein and, for this purpose is disposed preferably between said carburetter and a stove 14 which is adapted to warm the intake air from the hot exhaust pipe 15 after the engine is in operation. The connections between the heater and the stove and carburetter may be made in any suitable manner as by the flexible conduits 16 and 18.

The heater with which this invention is more particularly concerned, comprises a receptacle 20 of suitable dimensions and formed with the approximately cylindrical side wall 22 and the flat and integral end walls 24 and 26. Said receptacle is adapted to be disposed in an approximately horizontal position, as illustrated in Fig. 1, and may be formed or provided with depending lugs 28 by which the receptacle may be attached to a suitable supporting bracket 30.

A conduit 32 is extended horizontally through the upper part of said receptacle, or in a position which is substantially above the bottom of the receptacle, and said conduit is here shown as integral with the end walls of the receptacle. Said end walls may be formed with projecting bosses 34 and 36 which have passages 35 and 37 therethrough disposed in alignment with the interior of said conduit 32, whereby to provide a clear and unobstructed passage through the heater for the air to be heated. Said connecting conduits 16 and 18 may be received in said boss-passages and secured in place therein in any suitable manner. Said conduit 32 is adapted to be heated in a manner hereinafter set forth, and the side wall of the conduit is adapted to be relatively thin whereby to become heated rapidly and conduct heat rapidly to the air drawn through the conduit by the operation of the engine.

Said receptacle is formed or provided with a rectangularly-shaped neck 38 which extends upwardly above the cylindrical body of the receptacle; and a relatively large passage 40 in said neck provides communication between the interior of said receptacle and the atmosphere. Said passage 40 is adapted normally to be closed by a cover 42, which cover may have lugs 44 extended laterally from one side thereof, which lugs cooperate with lugs 46 carried by the body of the receptacle and pins 47 in said lugs to form a hinged support for the cover. Said cover is adapted releasingly to be secured in closing relation with the receptacle-opening by suitable means as a latch 49. Said latch is fixed to a knob 48 which is rotatable in said cover and is under a frictional restraint provided by a spring washer 50. Said latch is adapted to enter a slot 52 in an upstanding lug 54 of the receptacle-body and thereby lock said cover releasingly against pivotal movement about its hinge-connection.

When the heater is to be used, the cover 42 is raised away from the opening and moved into some position as indicated by the dotted lines, Fig. 4, and a supply of readily volatile fuel, as alcohol, for instance, is introduced into the interior of the receptacle, to lie in the bottom thereof to some level $a$, which level, however, is adapted to be substantially below the bottom of the air conduit 32. The fuel is ignited in any suitable manner and burns within the receptacle and the flames and heated products of combustion circulate about the air conduit and pass upward in the passages $b$ on each side of the conduit and thence out of the open top of the receptacle. The receptacle is provided with an opening only at the top and air for combustion with the fuel pass downwardly through the open top at the same time that the heated products of combustion pass upwardly and escape through the open top.

In a relatively short time the wall of the air conduit becomes hot and the engine may be rotated, to set it in operation. The cold air becomes heated in passing through the hot air conduit by the suction effect of the rotating engine, and thereby facilitates the formation of a combustible mixture in the carburetter. After the engine is operating under its own power, the flame in the heater may be extinguished by moving the cover 42 over the receptacle-opening whereby to exclude air from the fuel in the receptacle.

If desired, a shield, comprising a flat plate 60, may be attached, preferably removably, to one of the end walls of the receptacle by bolts 62. Said shield is arranged to extend upwardly above the open top and serves to protect adjacent parts of the engine, and especially the carburetter, against contact with the heated products of combustion.

The construction may be modified without departing from the spirit of the invention.

I claim:

1. An air heater comprising a receptacle open only at the top and adapted to contain a supply of fuel in the closed bottom thereof, an air conduit extended through said receptacle and spaced from the bottom and sides of the receptacle and having exposed inlet and outlet openings, and a removable closure for the open top of said receptacle.

2. An air heater comprising a receptacle adapted to contain a supply of fuel and having a passage providing access of air to the fuel, an air conduit extended through said receptacle in position to be heated by the burning fuel and provided with inlet and outlet openings, and means to extinguish the burning fuel including means to close said passage.

3. An air heater comprising a receptacle open only at the top and adapted to contain a supply of liquid fuel in the closed bottom thereof, an air conduit extended approximately horizontally through said receptacle in the upper portion thereof and spaced from the side wall of the receptacle, said conduit having inlet and outlet openings external of the receptacle, and a removable cover for the open top of the receptacle.

4. An air heater comprising a receptacle open only at the top and adapted to contain a supply of fuel in the closed bottom thereof, an air conduit extended approximately horizontally through said receptacle in the upper portion thereof and beneath the top opening and spaced from the side wall of the receptacle, said conduit having inlet and outlet openings external of the receptacle and a removable cover for the open top of the receptacle.

5. An air heater comprising an approximately cylindrical receptacle having end walls and open only at the top, an air conduit extended through the receptacle between said end walls and having inlet and outlet openings through said end walls, said conduit spaced from the side wall of the receptacle, and a removable cover for the open top of the receptacle.

6. An air heater comprising an approximately cylindrical receptacle having end walls and open only at the top, an air conduit extended through the upper portion of the receptacle between said end walls and having inlet and outlet openings through said end walls, said conduit disposed beneath the open top and spaced from the side wall of the receptacle, and a removable cover for the open top of the receptacle.

7. An air heater comprising an approximately cylindrical receptacle open only at the top and having integral end walls, an air conduit integrally formed with and extended between said end walls in the upper part of the receptacle and disposed beneath the top opening and spaced from the side wall of the receptacle, said end walls having outwardly extended bosses provided with apertures therein which are in register with the passage through said conduit, and a cover for the top opening having means loosely connecting it with the receptacle.

8. An air heater comprising an approximately cylindrical receptacle having end walls and open only at the top, a rectangular neck surrounding said opening, an air conduit extended through said receptacle in the upper portion thereof and beneath said opening and having inlet and outlet openings through said end walls, and a cover for said top opening having a hinged connection with said neck and means releasingly securing it in covering relation with said top-opening.

In testimony whereof, I have signed my name to this specification.

FRANZ W. YOUNG.